United States Patent [19]
Orr

[11] 3,787,097
[45] Jan. 22, 1974

[54] TRACK IDLER MOUNT AND RECOIL ADJUSTER

[75] Inventor: Bobby J. Orr, Springfield, Ill.

[73] Assignee: Allis-Chalmers Corporation, Milwaukee, Wis.

[22] Filed: June 7, 1972

[21] Appl. No.: 260,631

[52] U.S. Cl. .................................................. 305/10
[51] Int. Cl. .......................................... B62d 55/30
[58] Field of Search .................... 305/10, 31, 32, 30

[56] References Cited
UNITED STATES PATENTS

| | | | |
|---|---|---|---|
| 3,539,229 | 11/1970 | Scully | 305/10 |
| 3,337,208 | 8/1967 | Johansson | 305/10 |
| 2,818,311 | 12/1957 | Ashley | 305/10 |
| 3,733,107 | 5/1973 | Cote | 305/10 |

FOREIGN PATENTS OR APPLICATIONS

| | | | |
|---|---|---|---|
| 1,808,528 | 11/1968 | Germany | 305/10 |
| 940,561 | 9/1955 | Germany | 305/10 |
| 1,160,866 | 8/1969 | Great Britain | 305/10 |

Primary Examiner—David Schonberg
Assistant Examiner—Reinhard J. Eisenzopf
Attorney, Agent, or Firm—Charles L. Schwab, Robert B. Benson, Kenneth C. McKivett

[57] ABSTRACT

The track idler yoke of an endless track mechanism has a pair of forwardly extending legs mounted in a pair of cylindrical bearing members and has a rear end acted on by a hydraulic actuator which is connected to a gas charged hydraulic accumulator by way of a counterbalance valve. The counterbalance valve includes a differential pressure valve whereby the hydraulic actuator resists recoil of the track idler at a pressure approximately 1,640 pounds per square inch greater than the pressure exerted by the accumulator to return the idler to its normal operating position.

10 Claims, 4 Drawing Figures

PATENTED JAN 22 1974 3,787,097

TRACK IDLER MOUNT AND RECOIL ADJUSTER

BACKGROUND OF THE INVENTION

A great variety of track release devices have been suggested and/or provided by others. In some track release devices idler recoil is resisted by springs. In others, recoil of the idler is resisted by fluid devices or combined fluid pressure and spring mechanisms. Some track release mechanisms are designed so as to exert a positive pressure against the track idler during normal operations. Others are so designed as to primarily resist recoil action of the track idler without exerting forward thrust against the idler to positively tension the tractor during normal operation.

BRIEF DESCRIPTION OF THE PRESENT INVENTION

The present invention mounts the forward legs of the yoke for the track idler in a pair of slide type bearing members and the rear of the yoke is acted on by a hydraulic actuator. The hydraulic actuator is supplied fluid pressure from a gas charged accumulator by way of a counterbalance valve which resists recoil action of the idler with greater force than is exerted to reposition the idler after recoil.

DETAILED DESCRIPTION OF THE INVENTION

Figure 1:
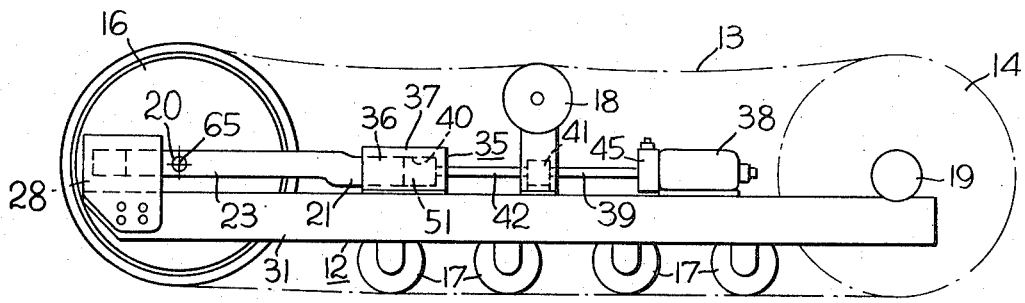
FIG. 1 is a side view of an endless track mechanism incorporating the present invention.

Referring to FIG. 1, an endless track mechanism is illustrated in which a track frame 12 has mounted thereon a sprocket 14, an idler 16, track rollers 17 and a supporting roller 18, such components serving to drive and support an endless track belt 13. The sprocket 14 is rotatably supported on the track frame by a bearing 19 and is driven by power means on the vehicle on which the track frame 12 is installed. The idler 16 is rotatably mounted on a shaft 20 pinned to a pair of forwardly extending legs 22, 23 of an idler yoke 21, the latter being shiftable longitudinally on the track frame 12 to achieve proper track adjustment.

Figure 2:
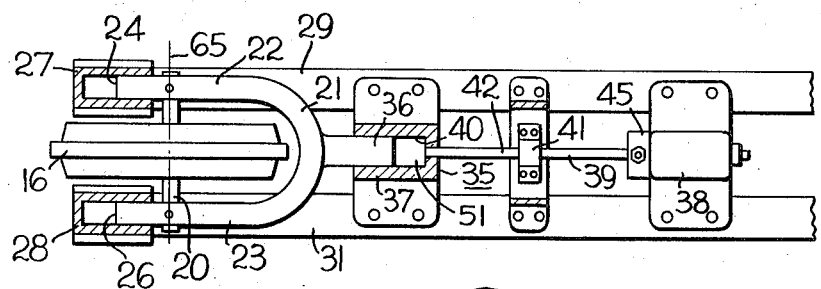
FIG. 2 is a partial top view of the mechanism shown in FIG. 1 with certain parts broken away for purposes of illustration.

Referring also to FIG. 2, the forwardly extending legs 22, 23 of the idler yoke 21 have parallel cylindrical ends 24, 26 which reciprocably fit into cylindrical bearings 27, 28 rigidly secured to channel members 29, 31 of the track frame 12. A cylindrical rear end 36 is formed on the idler yoke 21 in line with the idler and fits in fluid tight relation with the cylindrical interior bore 40 of a cylinder 37. Thus, the yoke end 36 and the cylinder 37 comprise a single acting hydraulic actuator 35 with a pressure chamber 51. The cylinder 37 is rigidly secured to the track frame 12. The hydraulic actuator 35 is supplied hydraulic fluid under pressure by a gas charged hydraulic accumulator 38 by way of a conduit 39, a counterbalance valve 41, and a conduit 42. Additionally, a relief valve housing 45 is mounted on the end of the accumulator 38 and includes a relief valve 62 and a suitable pressure type grease fitting 63 through which oil is pumped under pressure to adjust the track.

Figure 3:
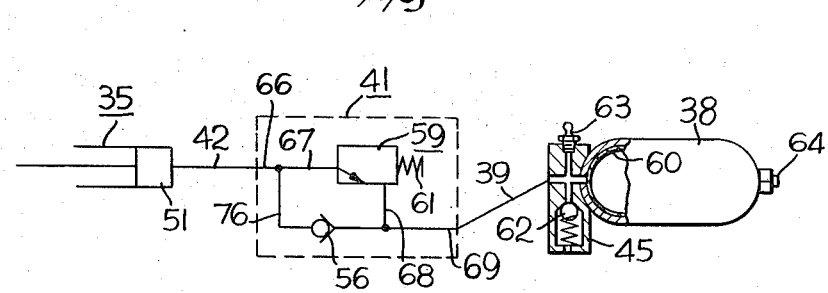
FIG. 3 is a schematic view of the hydraulic track adjusting mechanism of the present invention.

Referring to FIG. 3, the flexible bag 60 of accumulator 38 is normally precharged with nitrogen gas through fitting 64 to 1,900 pounds per square inch. When the accumulator 38 is in its bladder bottomed out position as shown in FIG. 3, the hydraulic actuator 35 is positioned to cause the idler 16 to adjust the track 13 to its proper operating condition. The track 13 is normally maintained in a nontensioned condition in which it is actually sufficiently loose to dip slightly between the idler 16 and the support roller 18. In the properly adjusted position of the track 13, the bag 60 of the accumulator 38 will be bottomed out, and thus the actuator 35 will normally not be urging the track forwardly so as to tension it, but rather the track will be draped around the idler and the thrust rearwardly by the idler yoke will be that caused by the nontensioned track weight and forces acting upon it during movement of the crawler tractor.

Figure 4:
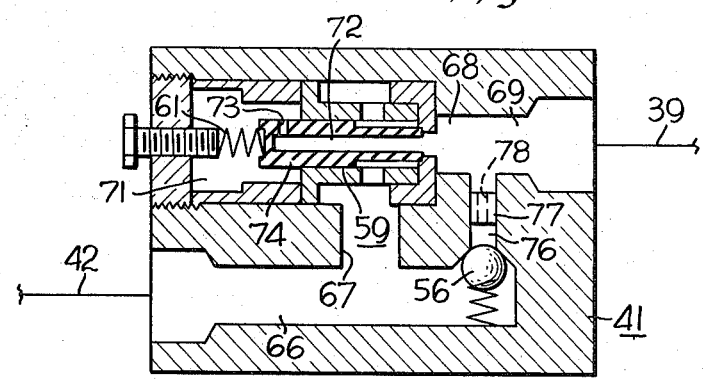
FIG. 4 is a section view of a counterbalance valve employed in the present invention.

Referring also to FIG. 4, the counterbalance valve 41 includes a check valve 56 which offers only a slight resistance to flow of oil from conduit 39 to the actuator 35. The check valve 56 prevents reverse flow through the passage 76. Thus, any return flow from the actuator 38 during idler recoil will pass through passage 67 and a differential pressure valve 59 which is biased by a suitable adjustable spring 61. The differential pressure valve 59 will open when a predetermined pressure differential exists between the conduit 42 and the conduit 39. In the illustrated embodiment, the pressure differential is 1,640 pounds per square inch. Thus, with the accumulator having an initial precharge of 1,900 pounds per square inch, initial rearward recoil movement of the idler yoke 21 will be resisted by fluid pressure in line 42 of about 3,540 pounds per square inch. A suitable commercially available counterbalance valve for use in the present invention is Model 1B12–P–6–30S made by Fluid Controls, Inc. of Mentor, Ohio.

Referring again to FIG. 3, the relief valve 62 is set for approximately 4,000 pounds per square inch, thus providing some measure of safety to relieve pressure before the accumulator is subjected to an excessive stress.

In the illustrated embodiment of the invention, the idler yoke 21 has a three point support with the rear central support being combined with the hydraulic actuator 35, thereby reducing components and cost. It will be noted that the legs of the yoke 21 are disposed to place the pivot axis 65 of the idler 16 above the axis of actuator 35. This design feature permits the elevation of the idler to be adjusted by placing the yoke in an upside down position and by adjusting the elevation of bearings 27, 28. This reversible idler yoke may also allow the same idler yoke to be used in a different size crawler tractor, thus reducing the number of different parts that need be maintained in inventory for manufacturing and spare parts purposes.

To provide an initial longitudinal adjustment for the idler 16, the filler plug 63 is removed and a predetermined quantity of hydraulic fluid is placed in the hydraulic system comprising actuator 35, conduits 42, 39, valve 41 and accumulator 38. The plug 63 is replaced and then the accumulator is charged with nitrogen to 1,900 pounds per square inch. The system is proportioned so that when the foregoing steps are taken the hydraulic fluid will be forced from the accumulator and the idler will be in the correct forwardly shifted position to properly position the track. Little, if any, tension is actually placed on the track. Upon wear of the track, the idler 16 can be adjusted forwardly by adding hydraulic fluid to the system. This can be done by adding hydraulic fluid such as oil by a pressure gun connected to fitting 63.

The recoil circuit includes conduit 42, passages 66, 67, differential pressure valve 59, passages 68, 69 and conduit 39. The pressure in chamber 71 of valve 41 is the same as the pressure in conduit 39 because of the axial bore 72 and opening 73 in the shiftable spool 74 of valve 59. The spring 61 is sufficiently strong to require 1,640 pounds per square inch pressure differential between conduit 42 and conduit 39 before the flow control spool 74 will move to the left and open to permit flow of fluid from the actuator 35 to the accumulator 38.

The hydraulic circuit for reseting the idler following recoil includes a bypass passage 76, interconnecting passages 76, 66 and one way flow control means in the form of check valve 56. In some tractors it may be desirable to provide a slower return of the idler following recoil and for this purpose a restrictor 77 with a suitable orifice 78 can be included in passage 76.

The embodiments of the invention in which an exclusive property or privilege is claimed are defined as follows:

1. In an endless track mechanism including a track frame and a track idler rotatably mounted on a yoke connected to the track frame for rearward longitudinal recoil and adjustment relative thereto including a rear end portion in line with said idler, a track recoil and adjusting system comprising:
    a hydraulic actuator having cylinder and piston components, one of which is secured to said track frame and the other of which is on a rear end portion of said yoke,
    a gas charged hydraulic accumulator which is bottomed out during normal operation of said track mechanism,
    a differential pressure valve,
    a conduit connecting said differential pressure valve to said actuator,
    a conduit connecting said differential pressure valve to said accumulator, said differential pressure valve opening to pass hydraulic fluid from said actuator to said accumulator during recoil upon the pressure in said actuator exceeding the pressure in said accumulator by a predetermined amount,
    a bypass circuit connected to said conduits in bypassing relation to said differential pressure valve,
    a check valve in said bypass circuit permitting flow of hydraulic fluid from said accumulator to said actuator to adjust the idler forwardly,
    orifice means in said bypass circuit effecting slow return of said idler yoke to its normal forward position after rearward recoil thereof, and
    hydraulic relief valve means operatively associated with said accumulator operable to relieve pressure at a value substantially above the pressure at which said differential pressure valve opens, thereby preventing said accumulator from being subjected to excessive pressures.

2. The invention of claim 1 wherein said yoke includes a pair of forwardly extending legs having parallel cylindrical ends and further comprising a pair of cylindrical bearing members secured to said track frame in which said cylindrical ends are reciprocably mounted for longitudinal movement.

3. The invention of claim 2 wherein said piston is integrally formed on the rear end of said yoke.

4. The invention of claim 3 wherein the axis of said piston is horizontally spaced from the plane defined by the axes of said cylindrical forward ends of said yoke.

5. Means for mounting an idler on a frame for an endless belt comprising:
    a yoke rotatably carrying said idler and having forwardly extending legs presenting parallel cylindrical ends, respectively, and a rearwardly extending portion having a cylindrical end part,
    a pair of cylindrical bearing means on said frame reciprocably supporting said parallel cylindrical ends, and
    a support element on said frame having a cylindrical surface in cooperative engagement with said cylindrical end part, the axis of said cylindrical end part being spaced from the plane defined by the axes of said parallel cylindrical ends.

6. The invention of claim 5 wherein said cylindrical surface is a radially inward facing surface.

7. The invention of claim 6 wherein said support element is a cylinder of a hydraulic actuator.

8. The invention of claim 5 wherein said support element is a component of a single acting hydraulic actuator operable to adjust the longitudinal position of said yoke.

9. The invention of claim 8 wherein said component is a cylinder and said cylindrical end part is a piston.

10. In an endless track mechanism including a track frame and a track idler rotatably mounted on a yoke connected to the track frame for rearward longitudinal recoil and adjustment relative thereto including a rear end portion in line with said idler, a track recoil and adjusting system comprising:
    a pair of forwardly extending legs on said yoke having cylindrical ends,
    a pair of cylindrical bearing members secured to said track frame and reciprocably mounting said cylindrical ends for longitudinal movement,
    a hydraulic actuator having a cylinder secured to said track frame and a piston component integrally formed on the rear end of said yoke, the axis of said piston component being horizontally spaced from the plane defined by the axes of said cylindrical forward ends of said yoke,
    a gas charged hydraulic accumulator which is bottomed out during normal operation of said track mechanism,
    a differential pressure valve,
    a conduit connecting said differential pressure valve to said actuator,
    a conduit connecting said differential pressure valve to said accumulator, said differential pressure valve opening to pass hydraulic fluid from said actuator to said accumulator during recoil upon the pressure in said actuator exceeding the pressure in said accumulator by a predetermined amount,
    a bypass circuit connected to said conduits in bypassing relation to said differential pressure valve,
    a check valve in said bypass circuit permitting flow of hydraulic fluid from said accumulator to said actuator to adjust the idler forwardly, and
    hydraulic relief valve means operatively associated with said accumulator operable to relieve pressure at a value substantially above the pressure at which said differential pressure valve opens, thereby preventing said accumulator from being subjected to excessive pressures.

* * * * *